Wilson & Bartlett.
Railroad Switch.

No. 45,889. Patented Jan. 10, 1865.

Witnesses:
P. Gould
S. M. McIntire

Inventors:
J. F. Wilson
J. A. Bartlett
by their atty
J. B. Crosby

UNITED STATES PATENT OFFICE.

JOSEPH F. WILSON, OF BOSTON, AND JAMES C. BARTLETT, OF CHARLESTOWN, MASSACHUSETTS.

IMPROVED MODE OF OPERATING SWITCHES.

Specification forming part of Letters Patent No. 45,889, dated January 10, 1865.

*To all whom it may concern:*

Be it known that we, JOSEPH F. WILSON, of Boston, Suffolk county, State of Massachusetts, and JAMES C. BARTLETT, of Charlestown, Middlesex county, Massachusetts, have invented an Improvement in Operating Switch-Rails of Horse-Railroad Tracks; and we do hereby declare that the following, taken in connection with the drawings which accompany and form part of this specification, is a description of our invention sufficient to enable those skilled in the art to practice it.

This improvement relates to the means of operating the switch-rail of turn-outs in horse-railroad tracks, the object of the invention being to dispense with the ordinary extra manual attendance required to adjust the switch-rail by operating said rail directly from the car.

The invention consists, therefore, in a peculiar mechanism so constructed and applied to a car that it can be brought into position, as the car passes a switch, to operate the switch-rail, thereby guiding the car from one track to the other, as circumstances may require.

Figure 2:
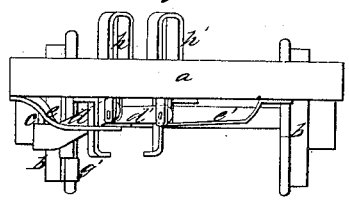
Figure 3:
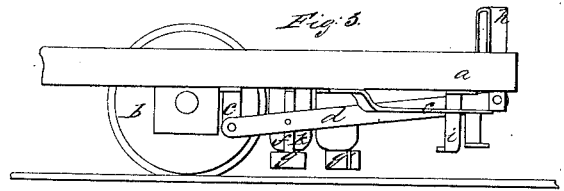
Figure 1:
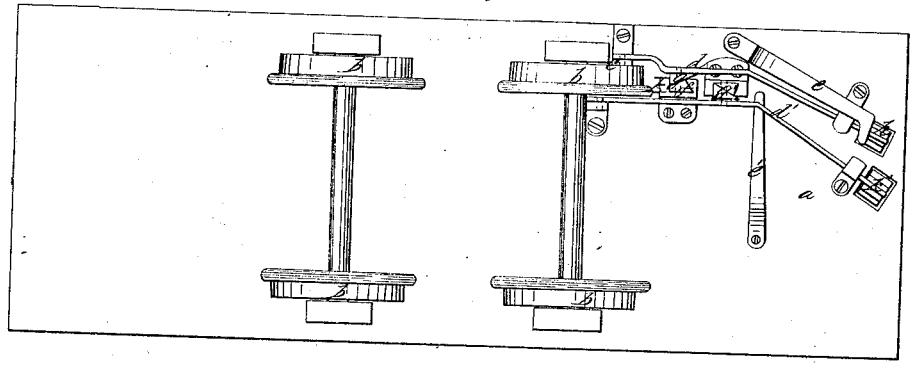
Figure 4:
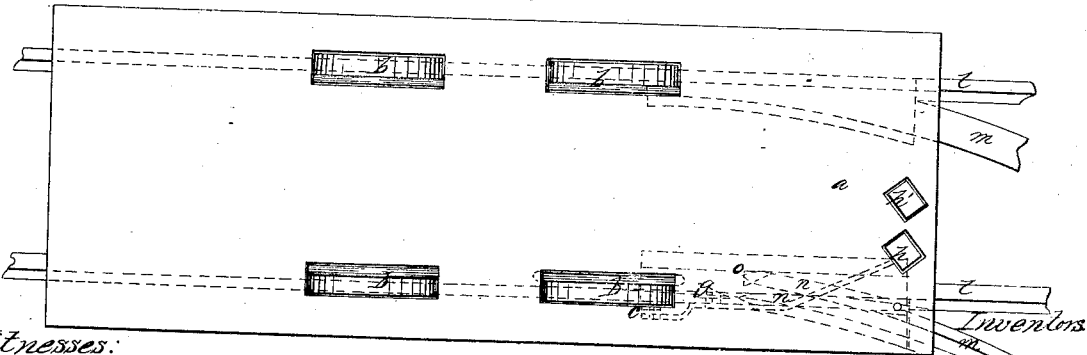

The drawings show a truck and platform of a car embodying our invention, Figure 1 representing a bottom view of the truck; Fig. 2 an end view, and Fig. 3 a side elevation, thereof; Fig. 4, a top view of the platform, showing the position of one of the switch-shippers with respect to a straight track and a turn-out therefrom.

$a$ denotes the platform of the car; $b$, the car-wheels. On the bottom of the car, and adjacent to one of the wheels, is fastened a bracket, $c$, on the lower end of which is jointed a long lever, $d$, which extends along under the platform and out to or nearly to the end thereof, the outer end of the lever being held up against the bottom of the car, or so as to keep a shipper or wedge, $g$, above the horizontal plane of the track-rails by a strong spring, $e$. Near the inner end of this lever, and just in advance of the car wheel, is a rod, $f$, having upon its lower end the shipper $g$, the rod being fastened to the lever with and by which the rod and shipping-wedge move. This shipper is held by the spring in its normal position above the horizontal plane of the tread of the wheels and the top of the track-rails, from which position it is capable of being moved by depression of the lever to the position shown by dotted lines, in which the shipper or the lower portion thereof is carried down below the top surface of the rails, and just inside and so as to run very closely to the rail. This depression of the lever is effected by a foot-piece, $h$, jointed or fastened to the front end of the lever and passing up through the platform, its top being in such position as to be readily operated by the driver of the car, or other person who may be upon the platform for the purpose. Too great depression of the lever may be prevented by a stop, $i$, or any other suitable means. To keep the shipper steady and prevent lateral movement, its rod $f$ may be made to slide in a guide-piece, $k$, as will be readily understood. The rails $l$ of the straight track are shown as connecting with the rails $m$ of a turn-out in the ordinary manner, a switch-rail, $n$, guiding the car as it passes the turn-out onto the continuation of the straight track or onto the turn out, according to the position in which said switch-rail is placed as the forward wheel of the car reaches it. The point of the switch-rail is made tapering, so as to stand a little away from the side of the rail $l$ or the guard-rail $o$ with which it may be in connection. Supposing the switch-rail to be in position, as seen in Fig. 4, for the car to continue on the straight track, (which it will do unless the switch-rail is swung over to the rail $o$,) and it is desired to have the car run onto the turn out. As the car approaches the switch the driver places his foot upon the foot-piece $h$ and depresses the lever $c$. This depression carries the shipper $g$ down inside of the rail $l$, so that as it reaches the point of the switch it enters between the switch-rail and the contiguous rail, and swings the point of the switch-rail over to the guard-rail $o$, as seen by dotted lines in Fig. 4, when it will be obvious that the car will be transferred to the turn-out, the heel of the shipper being of such width as to throw the point of the switch-rail over to the guard-rail.

To operate the switch-rail in the opposite direction or back to the main rail, where it connects with the turn-out, another shipper, $g'$, may be hung in a similar manner and at such distance within the path of the shipper $g$ as shall cause its point to enter between the guard-rail $o$ and the point of the switch, this wedge being attached to a lever, $d'$, kept in normal position by a spring, $e'$, and operated by a foot-piece, $h'$, in a similar manner to that described for the wedge $g$; and it may be remarked that these wedges may be applied to each or either side or end of a car, and singly or in pairs, our invention not being limited in this respect, as the mechanism may be arranged upon different cars, as circumstances may dictate or require.

It is well known that upon most horse-railway tracks, where they pass through the streets of cities, it is customary to employ a watchman to tend each switch, whose whole duty it is to keep the switch in position for the passage of the successive cars and according to the track upon which each is to run beyond the switch. Besides the constant expense attending the employment of these switchmen, it is not always possible for them to recognize an approaching car, so that the car frequently gets beyond the switch and upon the wrong track. Beyond city lines it is customary for the driver or conductor of a car to leave the car and run ahead of it to adjust the switch-rail before the car reaches it. These difficulties are entirely obviated by this invention, as the mechanism applied to the car is always within reach and under the control of the driver, who thus guides the car upon whichever track he may desire to proceed.

What we claim is—.

1. The employment of a shipping-wedge connected with and operated at will from the car, and so as to enter between the switch and main rails of a track, substantially as set forth.

2. The arrangement of the shipping-wedges for moving the rail in opposite directions, as shown and described.

JOSEPH F. WILSON.
JAMES C. BARTLETT.

Witnesses:
J. B. CROSBY,
FRANCIS GOULD.